July 20, 1926.
G. LAKE
LOCK NUT
Filed Sept. 28, 1925
1,592,831
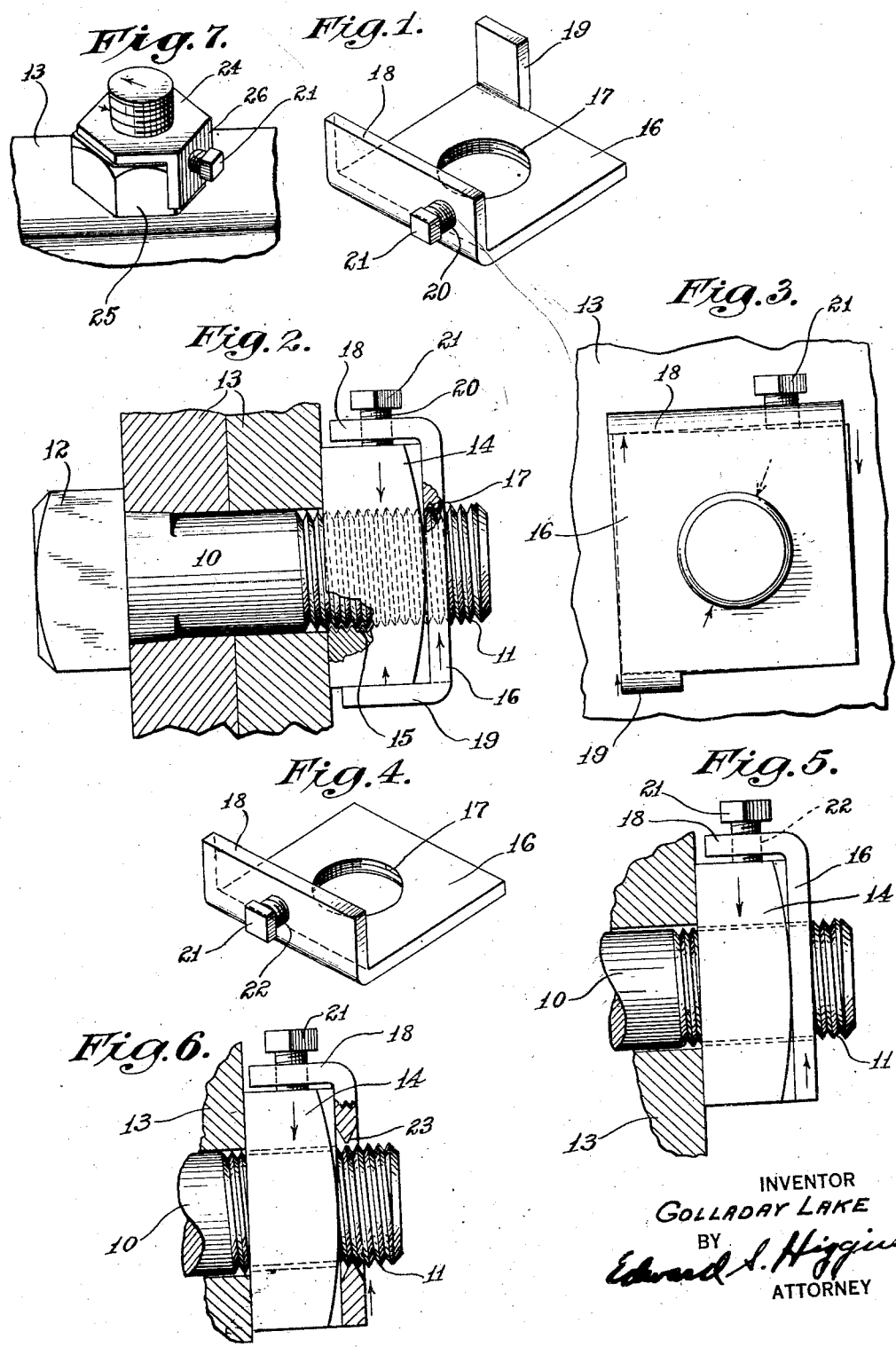
INVENTOR
GOLLADAY LAKE
BY
Edward S. Higgins
ATTORNEY Patented July 20, 1926.

1,592,831

UNITED STATES PATENT OFFICE.

GOLLADAY LAKE, OF NEW YORK, N. Y.

LOCK NUT.

Application filed September 28, 1925. Serial No. 58,968.

This invention relates to lock nuts. Many attempts have been made to provide means for securely holding a nut on a bolt. Some have attempted it by slotting the bolt longitudinally and passing a pin through the nut to engage the slot. This weakens the bolt and mutilates the threads thereof which is objectionable. Others provide the nut with a plurality of split washers and rings making such nuts very complicated and too expensive to manufacture.

It is a primary object of the present invention to provide a nut that will positively hold and can be used with the standard size and make of bolt. Another object is to provide a nut with minimum parts, eliminating the necessity for split washers and rings, and making it economical to manufacture.

The invention will be more fully explained hereinafter with reference to the accompanying drawing in which it is illustrated and in which—

Figure 1 is a perspective view of a disc forming part of the improved nut.

Figure 2 is a side view of a bolt having the improved nut applied thereto, some of the parts being in section and some broken away in the interest of clearness.

Figure 3 is an end view of the bolt and nut shown in Figure 2.

Figure 4 is a perspective view of a modified form of disc.

Figure 5 is a side view showing a nut with a modified form of disc as shown in Figure 4 applied to a bolt.

Figure 6 is a view similar to Figure 5 but showing another modified form of disc applied to a nut, parts of the disc being broken away.

Figure 7 is a perspective view of a modified form of nut and disc, the nut and disc being hexagonal in shape.

Similar characters of reference designate corresponding parts throughout the various views.

Referring to the drawing and with particular reference to Figure 2, the improved nut may be used with an ordinary bolt comprising a cylindrical body portion 10, having screw threads 11 and a head 12 of any desired shape. This bolt serves to hold the sections of the work 13 together.

Mounted on the screw thread portion of the bolt is a nut consisting of a squared shaped body portion 14 having a central bore provided with interior screw threads 15, which are adapted to engage the exterior threads 11 of the bolt.

Cooperating with said nut 14 is a disc 16. This disc 16 comprises a flat body portion formed with a centrally disposed bore of the same diameter as the diameter of the bore of the nut, which former bore has interior screw threads 17 also adapted to engage the exterior screw threads 11 of the bolt. Formed on one end of the flat body portion of the disc is a flange 18 and formed on the opposite end of said body portion adjacent one edge thereof is a lug 19. The flange 18 is provided with an opening 20 adjacent the side thereof opposite the side of the body mounting the lug 19, which opening 20 is interiorally screw threaded and is adapted to receive a screw 21 for a purpose which will be explained. When in operative position, as shown in Figure 2, the interior face of the lug 19 impinges against one of the flat sides of the nut, and the flange 18 overlies the opposite flat side of the nut but is spaced somewhat therefrom, and when in this position the lug 19 is on one side of the bolt and the screw 21 is located on the opposite side thereof.

In the form of disc illustrated in Figures 4 and 5, the flange 18 is formed with an interiorly screw threaded opening 22 which is disposed centrally thereof, and not disposed at one side of said bore of the flat body thereof, but in line therewith. This opening 22 is provided for the reception of the screw 21. It will be noted that this form of disc has no lug at the end opposite the flange 18.

With reference to Figure 6, the disc here illustrated consists of a flat body portion formed with a centrally disposed bore which bore is somewhat larger than the central bore of the nut 14. It will be noted that this bore is provided with a single convolution or screw thread 23 provided with a knife edge which is adapted to engage the threads 11 of the bolt. This single knife edged thread 23 is made somewhat stouter than the screw threads of the other forms of disc. This form of disc also has no lug for engagement with the nut, and because of its large bore may be slid over the threads 11 of the bolt without touching the same when it is being mounted on the bolt.

In Figure 7, a hexagonal shaped disc 24 is illustrated which is adapted to fit a hexagonal shaped nut 25. This disc 24 is formed with a flange 26 and when the flange 26 is in operative position overlies one of the flat sides of the nut 25. The flange 26 has a centrally disposed opening therein, interiorly screw threaded for the reception of a screw 21.

In operation, before mounting the disc 16 is placed on the nut 14 so that its flange 18 and lug 19 overlie the flat sides of the nut. The nut and disc are then screwed on simultaneously on the bolt and when in effective position as shown in Figure 2, the screw 21 is disposed at one side, to wit, the right side, of the screw threaded portion 11 of the bolt, and the lug 19 is disposed at the other or left hand side of said screw threaded portion 11 of the bolt. By setting up on the screw 21 the free end thereof impinges against the flat side of the nut and exerts a thrust downwardly (as shown by the arrow) on the right side of the bolt, thus tending to turn said nut in a clock-wise direction, and by reason of the lug 19 engaging the opposite flat side of the nut on the left hand side thereof a pulling action is exerted on said left hand side of the bolt tending to pull said nut and disc in a clockwise direction (as shown by the arrow). The downward thrust and upward pull tend to jam the interior threads of the nut and disc on the exterior threads of the bolt thereby securely locking said nut and disc on the bolt.

In using the modified forms of discs shown in Figures 4, 5 and 6, setting up on the screw 21 directs a thrust downwardly in the direction of the arrows, and results in an upward pull thereby jamming the interior threads of the nut and disc on the exterior threads of the bolt to lock the parts together.

Setting up on the screw 21 illustrated in Figure 7, exerts a pressure against the nut in the direction indicated by the arrow on the bolt and a simultaneously pulling action, in the opposite direction as indicated by the other arrow, thereby jamming the threads of the nut and disc with those of the bolt to lock the parts together.

While I have described several embodiments of my invention, it is to be understood that the essential features of my invention might be exemplified in various other alternative forms and I desire to be limited only by the state of the prior art and the appended claims.

I claim:

1. In combination with a bolt having an exterior screw threaded portion, a nut threaded on said threaded portion, a disc mounted on said latter portion and adapted to cooperate with said nut, and a set screw carried by said disc and adapted to impinge against said nut at one side of said bolt whereby a downward thrust is exerted against the nut and an upward pull is exerted on said disc locking the nut and disc on the screw threaded portion of the bolt.

2. In combination with a bolt having an exterior screw threaded portion, a nut threaded on said bolt, a disc mounted on said threaded portion adjacent said nut, said disc comprising a flat body portion having a central bore, a flange on one end thereof, said flange formed with an opening adjacent one side of the central bore and a lug on the opposite end of said flat body portion adjacent the opposite side of said central bore, said flange and lug adapted to overlie opposite flat sides of the nut, and a screw adapted to pass through the opening in the flange and impinge against the flat side of the nut whereby by setting up on said nut a thrust is exerted downwardly on the nut and a simultaneous pull exerted on the disc to lock the nut and disc on the bolt.

In testimony that I claim the foregoing as my invention, I have signed my name hereto.

GOLLADAY LAKE.